United States Patent
Bergman et al.

(10) Patent No.: US 11,386,661 B2
(45) Date of Patent: Jul. 12, 2022

(54) METHOD AND SYSTEM FOR CREATING A LIGHT SCRIPT FOR A VIDEO

(71) Applicant: SIGNIFY HOLDING B.V., Eindhoven (NL)

(72) Inventors: Anthonie Hendrik Bergman, Nuenen (NL); Simon Rycroft, Eindhoven (NL); Jonathan David Mason, Waalre (NL); Dzmitry Viktorovich Aliakseyeu, Eindhoven (NL); Jacobus Dingenis Machiel Van Boven, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 311 days.

(21) Appl. No.: 16/648,484

(22) PCT Filed: Sep. 11, 2018

(86) PCT No.: PCT/EP2018/074394
§ 371 (c)(1),
(2) Date: Mar. 18, 2020

(87) PCT Pub. No.: WO2019/052985
PCT Pub. Date: Mar. 21, 2019

(65) Prior Publication Data
US 2020/0234052 A1    Jul. 23, 2020

(30) Foreign Application Priority Data
Sep. 18, 2017  (EP) .................................... 17191593

(51) Int. Cl.
*H05B 47/155*     (2020.01)
*G06V 20/40*     (2022.01)
(Continued)

(52) U.S. Cl.
CPC .............. *G06V 20/46* (2022.01); *G06V 10/56* (2022.01); *G06V 20/41* (2022.01); *H05B 47/105* (2020.01); *H05B 47/155* (2020.01)

(58) Field of Classification Search
CPC .... H05B 47/155; H05B 47/105; H05B 47/10; H05B 47/175; G06V 20/41; G06V 20/46; G06V 10/56; Y02B 20/40
See application file for complete search history.

(56) References Cited

U.S. PATENT DOCUMENTS

8,912,727 B1 * 12/2014 Brunell ................ H05B 47/175
315/192
2008/0263620 A1   10/2008 Berkvens et al.
(Continued)

*Primary Examiner* — Haissa Philogene (57) ABSTRACT

A method of creating a light script for a video is disclosed. The light script comprises lighting control instructions for controlling one or more light sources when the video is being displayed. The method (600) comprises: —receiving a user input indicative of a selection of a lighting control instruction for a scene (S1, S11, S21, S31, S32), —associating the lighting control instruction (L1, L11, L21, L31, L32) with the scene (S1, S11, S21, S31, S32), —analyzing (602) the scene (S1, S11, S21, S31, S32) of the video to identify a scene characteristic (C1, C11, C21, C31, C32) in the scene, —analyzing (604) the video or another video to recognize, in a further scene (S4, S13, S24, S34), a similar or identical scene characteristic (C1, C11, C21, C31, C32), and—associating (606), based on the recognition of the similar or identical scene characteristic (C1, C11, C21, C31, C32), the lighting control instruction (L1, L11, L21, L31, L32) with the further scene (S4, S13, S24, S34), such that when the scene (S1, S11, S21, S31, S32) and the further scene (S4, S13, S24, S34) are being displayed the one or more light sources are control led according to the lighting control instruction (L1, L11, L21, L31, L32).

14 Claims, 6 Drawing Sheets

(51) Int. Cl.
*H05B 47/105* (2020.01)
*G06V 10/56* (2022.01)

(56) References Cited

U.S. PATENT DOCUMENTS

| | | |
|---|---|---|
| 2009/0176569 A1 | 7/2009 | Eves et al. |
| 2009/0219305 A1 | 9/2009 | Diederiks et al. |
| 2017/0345208 A1* | 11/2017 | Ashdown ............... H05B 31/50 |
| 2021/0176847 A1* | 6/2021 | Kamp ................. H05B 47/155 |

* cited by examiner

METHOD AND SYSTEM FOR CREATING A LIGHT SCRIPT FOR A VIDEO

CROSS-REFERENCE TO PRIOR APPLICATIONS

This application is the U.S. National Phase application under 35 U.S.C. § 371 of International Application No. PCT/EP2018/074394, filed on Sep. 11, 2018, which claims the benefit of European Patent Application No. 17191593.7, filed on Sep. 18, 2017. These applications are hereby incorporated by reference herein.

FIELD OF THE INVENTION

The invention relates to a method of creating a light script for a video. The invention further relates to a computer program product for executing the method. The invention further relates to a system for creating a light script for a video.

BACKGROUND

The number of connected lighting systems in home environments is increasing. These connected lighting systems comprise light sources which can be controlled individually, for example based on control signals received from a smart device, such as a smartphone. Additionally, these light sources can be controlled based on other content, such as video content. U.S. patent application 2009/176569 A1 discloses a system configured to control connected light sources based on content that is being displayed on a television. The light sources are controlled real-time based on an analysis of the on-screen content. An alternative to such real-time lighting control based on video content is to provide light scripts for these videos. U.S. patent application 2008/263620 A1, for example, discloses that light scripts comprise preprogrammed/predefined lighting control instructions for controlling one or more light sources when a video is being displayed, which lighting control instructions are communicated to the connected lighting system while the video is being displayed such that light effects created by the light sources are synchronized with on-screen events. Creating such a preprogrammed/predefined light script can be cumbersome, because it requires a movie producer or a lighting designer to manually select light settings for each video scene/video event.

SUMMARY OF THE INVENTION

It is an object of the present invention to simplify the process of creating light scripts for videos.

According to a first aspect of the present invention, the object is achieved by a method of creating a light script for a video, the light script comprising lighting control instructions for controlling one or more light sources when the video is being displayed, the method comprising:
  receiving a user input indicative of a selection of a lighting control instruction for a scene,
  associating the lighting control instruction (L1, L11, L21, L31, L32) with the scene,
  analyzing the scene of the video to identify a scene characteristic in the scene,
  analyzing the video or another video to recognize, in a further scene, a similar or identical scene characteristic, and
  associating), based on the recognition of the similar or identical scene characteristic, the lighting control instruction with the further scene, such that when the scene and the further scene are being displayed the one or more light sources are controlled according to the lighting control instruction.

By analyzing the video (or another video) for identifying further scenes having similar/identical characteristics to the scene characteristic of the (initial) scene, and by associating a lighting control instruction with the (initial) scene and the further scenes, the light sources of a lighting system are controlled according to the same lighting control instruction for similar/identical video scenes. This is beneficial, because it reduces the number of (manual) inputs required for generating/creating the light script, and it thereby simplifies the creation of the light script for the video. An additional benefit of this method, is that the light effects generated by the light sources are consistent throughout the video. This may be further beneficial when another video (different from the video wherein the scene has been identified) is analyzed for similar/identical scenes, because it creates consistency between light effects for related videos (e.g. different episodes of a tv-show, related movies, intro scenes for movies, etc.).

The lighting control instruction may be obtained in different ways.

The method comprises receiving a user input indicative of a selection of the lighting control instruction for the scene. This embodiment enables a user to determine how the light sources are to be controlled during the scene (and, consequently, during the further scene). This step may occur before or after the analysis steps. In embodiments wherein the user input is received before the analysis of the scene or before the analysis of the video or the other video, a user may first select how the light sources are to be controlled during the scene, whereupon the rest of the video (or another video) is analyzed for similar/identical scenes, whereafter the user-defined lighting control instruction is applied to those similar/identical scenes. This is beneficial, because once a user has determined a lighting control instruction for a certain scene, that lighting control instruction is automatically copied to the similar/identical scenes, thereby removing the need for manually copying or creating the lighting control instructions for those similar/identical scenes.

The lighting control instruction may further comprise:
  extracting one or more colors from one or more images of the scene, and
  generating the lighting control instruction based on the one or more colors. This enables automatic creation of the lighting control instruction, whereafter the automatically generated lighting control instruction is applied to similar/identical scenes. This further simplifies the creation of the light script for the video.

The lighting control instruction may comprise color information, position information and/or timing information for controlling the one or more light sources. The color information may relate to the color, brightness and/or saturation of the light emitted by the one or more light sources when the video is being displayed. The position information may relate to where a certain light effect is to be created when the video is being displayed (e.g. left/right of the display, above/below the display, in front/behind a user, etc.). The timing information may relate to when a certain light effect is created when the video is being displayed.

The method may further comprise associating the lighting control instruction with one or more intermediate scenes of the video in between the scene and the further scene. This may be beneficial when a certain light effect is present during the scene and the further scene (e.g. a fire light effect during a fire scene), but should continue along the intermediate scenes in between those scenes (for instance, it may be desirable to continue the fire light effect during a close-up of an actor in between two fire scenes). The step of associating the lighting control instruction with the one or more intermediary scenes may be executed (only) if a pre-defined condition is met.

The step of associating the lighting control instruction with the one or more intermediary scenes may be executed (only) if a time period between the scene and the further scene is below a threshold time period. Thus, when the time period between a first scene having a certain characteristic and a second scene having the same characteristic is shorter than a predefined time period, the lighting control instruction is also associated with the scenes in between the first and the second scene.

The method may further comprise the steps of:
analyzing the scene, the further scene and the one or more intermediary scenes,
identifying a secondary scene characteristic, different from the scene characteristic, in each of the scene, the further scene and the one or more intermediary scenes,
wherein the step of associating the lighting control instruction with the one or more intermediary scenes is executed if the secondary scene characteristic has been identified in the scene, the further scene and the one or more intermediary scenes.

The step of analyzing the scene to identify the scene characteristic may comprise identifying at least one object, shape, character and/or person in the scene, and the step of analyzing the video or another video to recognize, in the further scene, the scene characteristic may comprise recognizing the at least one recognized one object, shape, character and/or person in the further scene. It may be beneficial to analyze the scenes of the video (or the other video) for visual characteristics such as objects, shapes, characters and/or persons, because this may create consistency between light effects for related visual characteristics.

The step of analyzing the scene to identify the scene characteristic may comprise identifying at least one audio fragment in the scene, and the step of analyzing the video or another video to recognize, in the further scene, the scene characteristic may comprise recognizing the at least one recognized audio fragment in the further scene. It may be beneficial to analyze the scenes of the video (or the other video) for auditory characteristics such as songs, sound effects or voices, because this may create consistency between light effects for related auditory characteristics.

The step of analyzing the scene to identify the scene characteristic in the scene may comprise identifying a plurality of scene characteristics in the scene, and the method may further comprise:
communicating the plurality of scene characteristics to a user via a user interface,
receiving one or more user inputs representative of a selection of one or more of the plurality of scene characteristics,
and the analysis of the video or another video may comprise recognizing, in the further scene, the one or more selected scene characteristics. This enables a user to select one or more characteristics in the (initial) scene of the video which may subsequently be used for analysis of other scenes of the video (or the other video).

The method may further comprise:
obtaining a first weight value for a first scene characteristic in a first scene associated with a first lighting control instruction,
obtaining a second weight value for a second scene characteristic in a second scene associated with a second lighting control instruction, and
associating, if the first and second scene characteristics are recognized in the further scene, the first or the second lighting control instruction with the further scene based on the first and second weight values. A user, for example, may provide a weight value for each of the scene characteristics. Thus, if a further scene has scene characteristics of multiple (initial) scenes, the weight value of the scene characteristics of the (initial) scenes may be decisive in determining with which lighting control instruction of which (initial) scene the further scene is associated.

The method may further comprise, before associating the lighting control instruction with the further scene, receiving a user input indicative of an acceptance of the association between the lighting control instruction and the further scene. This enables the user to approve/accept that the lighting control instruction of the further scene is to be applied to/associated with the further scene, which is beneficial because it provides a higher level of user control.

The method may further comprise storing the light script as a computer readable file, or embedding the light script in a video file of the video. Storing the light script as a computer readable file separate from the video file may be beneficial, because the video content may be provided via a different service than the light script. A video playback device may, for example, play the video content, while simultaneously, a lighting control device may control light sources of a lighting system synchronously according to the lighting control instructions of the light script. Alternatively, the light script may be encoded together with the actual video stream, which may be beneficial for devices that are configured to display the video and transmit lighting control commands based on the lighting control instructions of the light script to light sources of a lighting system.

According to a second aspect of the present invention, the object is achieved by a computer program product for a computing device, the computer program product comprising computer program code to perform any one of the above-mentioned methods when the computer program product is run on a processing unit of the computing device.

According to a third aspect of the present invention, the object is achieved by a system for creating a light script for a video, the light script comprising lighting control instructions for controlling one or more light sources when the video is being displayed, the system comprising
a user interface configured to receive a user input indicative of a selection of a lighting control instruction for a scene, and
a processor configured to associate the lighting control instruction with the scene, analyze the scene to identify a scene characteristic in the scene, analyze the video or another video to identify, in a further scene, a similar or identical scene characteristic, and to associate, based on the recognition of the similar or identical scene characteristic, the lighting control instruction with the further scene, such that when the scene and the further scenes are being displayed the one or more light sources are controlled according to the lighting control instruction.

The system may further comprise a memory configured to store the created light script.

It should be understood that the claimed system may have similar or identical embodiments and advantages as the claimed method.

In the context of the present invention the term "scene characteristic" relates to an (image) characteristic of the scene that can be identified by analyzing one or more images of the scene, for example by applying known image recognition techniques. Alternatively, the term relates to a characteristic of the scene that can be identified by analyzing the audio stream of the video. Examples of scene characteristics include but are not limited to objects (such as vehicles, machines, plants, infrastructure elements, etc.), materials (such as metals, wood, ice, etc.), shapes of objects, people (such as actors), characters (such as animals, fictitious characters, etc.), dominant colors, events (such as explosions, natural phenomena, specific motions of specific objects, people or characters, etc.) and audio fragments (e.g. songs, spoken audio, background music, sound effects, etc.).

In the context of the present invention the term "lighting control instruction" relates to lighting control instructions for one or more light sources or for a lighting system that may control one or more light sources according to the lighting control instructions. The lighting control instruction may, for example, comprise lighting control commands which are configured to be executed by a lighting system or by one or more light sources. The lighting control instruction may, for example, comprised instructions for controlling the light sources according to a certain color, brightness and/or saturation. In embodiments, the lighting control instruction may be a control instruction to turn the light sources off.

In the context of the present invention the term "scene" relates to a sequence of images of the video and, optionally, the audio that corresponds to that scene. The scene may, for example, be at least a part of an (uninterrupted) on-screen action. The action may occur in the video in a single location and continuous time. In embodiments, a scene may also be an on-screen action that occurs in the video at multiple locations over time, which has a common scene characteristic (e.g. a common audio track, a common actor, a common event, etc.).

The duration of the further scene may be similar/identical to the duration of the (initial) scene. The (initial) scene and the further scene may, for example, be identical scenes such as opening scenes of different episodes of a tv-show. The duration of the further scene may be different from the duration of the (initial) scene. The (initial) scene may, for example, be a scene comprising a fire, and the further scene may, for example, also comprise a fire and have a longer duration. A duration of the further scene(s) may be determined based on a user input. A user may, for example, provide a user input indicative of a desired minimum or maximum duration for a further scene.

BRIEF DESCRIPTION OF THE DRAWINGS

The above, as well as additional objects, features and advantages of the disclosed systems, devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
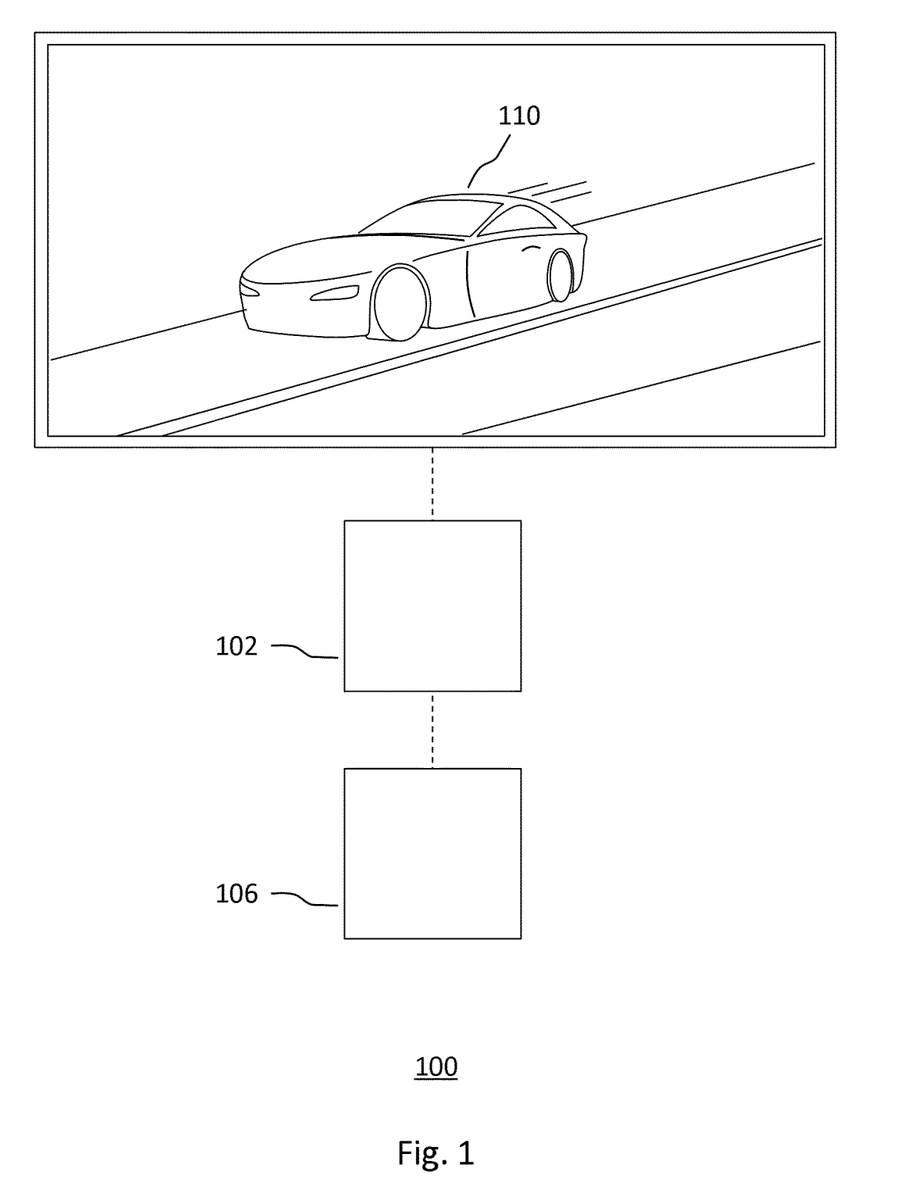
FIG. 1 shows schematically an embodiment of a system for creating a light script for a video.
Figure 2:
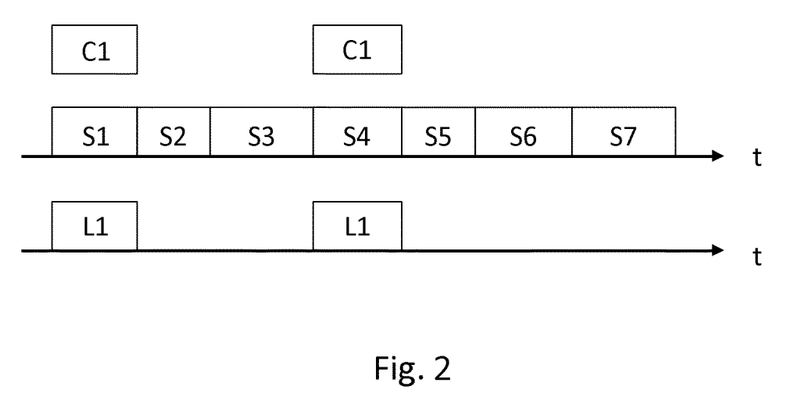
FIG. 2 shows schematically an example of a timeline of a plurality of scenes of a video, scene characteristics of these scenes and lighting control instructions associated therewith.

FIG. 1 illustrates a system 100 for creating a light script for a video. The light script of the video comprises lighting control instructions for controlling one or more light sources (not shown) when the video is being displayed. The system 100 comprises a processor 102 configured to analyze the scene to identify a scene characteristic in the scene, analyze the video or another video to identify, in a further scene, the same scene characteristic, and to associate the lighting control instruction with the scene and the further scene, such that when the scene and the further scene are being displayed the one or more light sources are controlled according to the lighting control instruction. This is further illustrated in FIG. 2, which shows a timeline of a video comprising a plurality of scenes S1-S7. The processor 102 may analyze a scene, for example scene S1, and identify a scene characteristic C1 therein. The processor 102 may further analyze the remaining scenes S2-S7 of the video and recognize the scene characteristic C1 in scene S4 as well, whereupon the processor 102 may associate a lighting control instruction L1 with the scenes S1 and S4.

The processor 102 (e.g. a microchip, circuitry, a microcontroller, etc.) may for example be comprised in a computer system such a desktop pc, a tablet pc, a smartphone, etc. The video may be stored locally in a memory of a device comprising the processor 102 and a memory 106. Alternatively, the video may be stored remotely and the processor 102 may access the video via a network.

The processor 102 is configured to associate a lighting control instruction with the scene (and the further scene) of the video. The lighting control instruction may be related to color information, position information and/or timing information for controlling the one or more light sources. The color information may relate to the color, brightness and/or saturation of the light emitted by the one or more light sources when the video is being displayed. The position information may relate to where a certain light effect is to be created when the video is being displayed (e.g. left/right of the display, above/below the display, in front/behind a user, etc.). If the locations of light sources relative to a display where the video will be displayed are known, the light sources can be controlled according to the position information of the lighting control instructions. A controller of the lighting system may be configured to map the position information of the lighting control instruction onto the actual light sources. The timing information may relate to when a certain light effect is created when the video is being displayed. Some light effects may be dynamic light effects (i.e. light effects that change over time). The timing information may relate to when a color of the light emitted by a light source should change.

The processor 102 may be configured to obtain the lighting control instruction. The lighting control instruction for the scene may be obtained in different ways. For example, the processor 102 may be coupled to a user interface for creation of lighting control instructions (see for example FIG. 5, explained below). The user interface may be configured to receive a user input indicative of a selection of the lighting control instruction for the scene, and the lighting control instruction may be based on the user input. The user interface, for example a touch interface, a gesture-based interface, a voice based interface, etc., may have an input means (e.g. touch, gesture, voice) for receiving the user input. The user input may, for example, relate to a selection of a static light color (e.g. a blue color resembling water) or a dynamic light color (e.g. a flickering orange color resembling a fire) for the scene, and the processor 102 may generate a lighting control instruction for the scene comprising a lighting control command for controlling the one or more light sources such that they emit light according to the static/dynamic color selected by the user when the video is being displayed. The user input may be further related to a selection of a position for a selected color, and the processor 102 may generate the lighting control instruction such that it further comprises position information for the selected color. A lighting control system may be configured to control one or more light sources with known positions relative to a display displaying the video according to the position of the color.

Additionally or alternatively, the processor 102 may be configured to analyze a scene to extract one or more colors from one or more images of the scene, and generate the lighting control instruction based on the one or more colors. The processor 102 may, for example, extract one or more dominant colors from one or more images of the scene and generate the lighting control instruction based on the one or more dominant colors. In another example, the processor 102 may analyze one or more images of the scene and use known image analysis techniques to recognize for example an object, an event or a person (e.g. a vehicle, a burning fire, an explosion, a movie character, etc.) and generate the lighting control instruction based thereon. For example, a burning fire may be detected in the scene, and the processor 102 may generate a lighting control instruction for the scene comprising a lighting control command for controlling the one or more lighting devices such that they resemble the burning fire.

Additionally, the processor 102 may be configured to determine positions of the extracted one or more colors in the one or more images, and generate the lighting control instruction based thereon. The processor 102 may, for example, extract a blue (sky) color from the top of the one or more images, and extract a green (grass) color from the bottom of the one or more images. The processor 102 may thereafter generate the lighting control instruction such that it further comprises position information for the colors (blue above, green below). A lighting control system may be configured to control one or more light sources with known positions relative to a display displaying the video according to the positions of the colors (e.g. by controlling ceiling luminaires such that they emit the blue light, and floor luminaires such that they emit green light).

The system 100 may comprise a user interface configured to receive a user input indicative of an acceptance of the association between the lighting control instruction and the further scene. Upon receiving the acceptance, the processor 102 may associate the lighting control instruction with the further scene.

The processor 102 is further configured to analyze the scene to identify a scene characteristic in the scene. The processor 102 may use known image analysis techniques to extract one or more features from one or more images of the scene. The processor 102 may, for example, identify an object (a vehicle 110 in FIG. 1) in the scene. A user may, for example, associate a lighting control instruction with that scene (e.g. a lighting control instruction to set the color of the one or more light sources to a color similar to the vehicle's 110 color). After identifying the scene characteristic, the processor 102 analyses other scenes of the video (or scenes of another video) to determine whether the scene characteristic (the vehicle 110 in FIG. 1) is present in another (further) scene of the video. If, for example, the vehicle 110 is present in one or more other (further) scenes, the processor 102 associates the lighting control instruction with those scenes. As a result, when the video is being displayed, each time the vehicle 110 is shown on a display/screen, the one or more light sources are controlled according to the same lighting control instruction (which in this example would result in that the light sources are controlled according to the color of the vehicle each time it appears on screen).

The processor 102 may be further configured to store the light script as a computer readable file, separate from the video file. This enables distributed video playback and lighting control. A video playback device (such as a television, a smartphone, a set-top box, a digital media player, etc.) may, for example, play the video content, while simultaneously, a lighting control device (such as a smartphone, a bridge, a home control system, etc.) may control light sources of a lighting system synchronously according to the lighting control instructions of the light script. The light script (and the video) may be streamed from a remote server. Additionally or alternatively, the processor 102 may be configured to embed the light script in a video file of the video. The light script may be encoded together with the actual video stream, which enables a device (such as a smartphone, a tablet pc, a home entertainment system, etc.) configured to display the video on a display and transmit lighting control commands based on the lighting control instructions of the light script to light sources of a lighting system.

Figure 3:
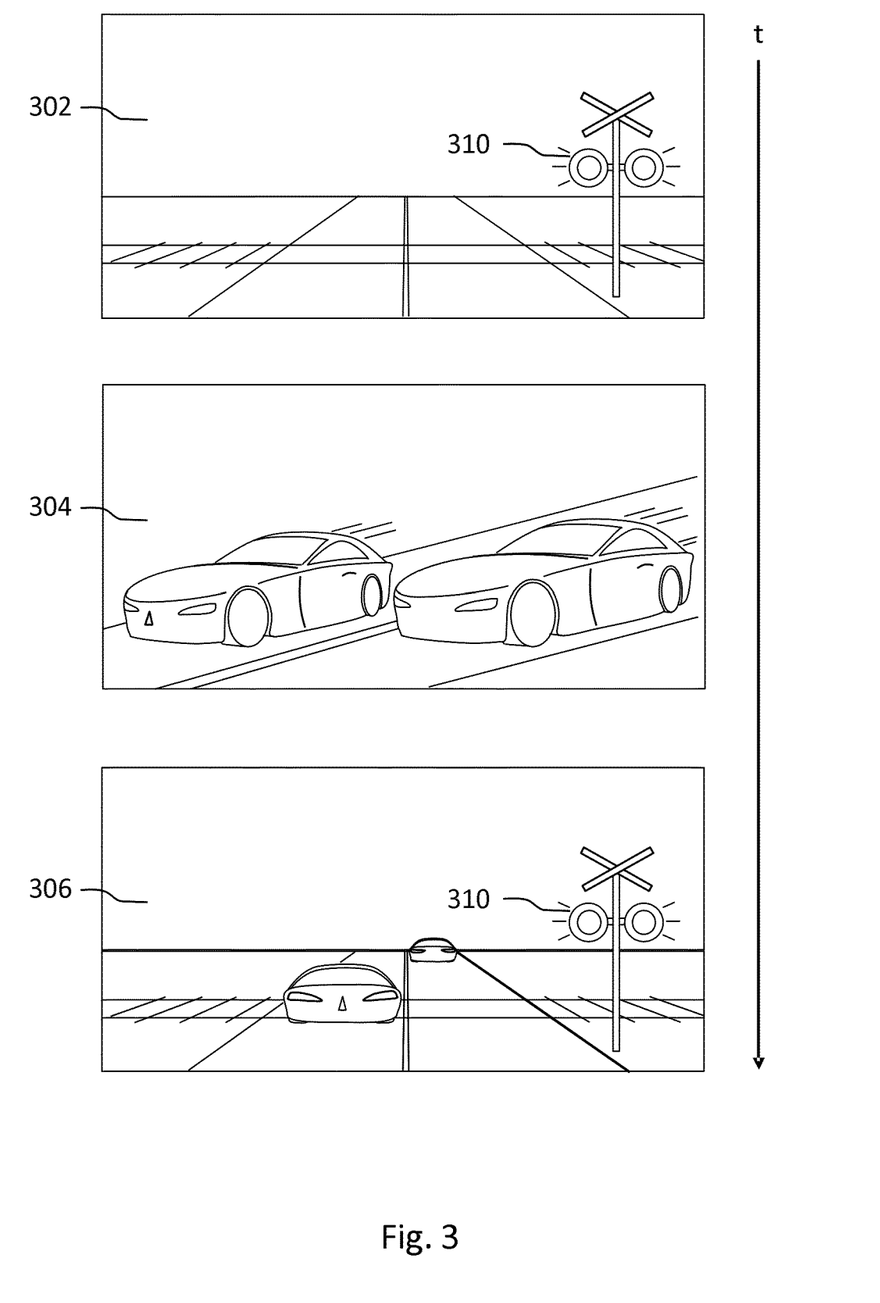
FIG. 3 shows schematically an example of a time line of a plurality of scenes of a video.

In embodiments wherein the processor 102 is configured to analyze the video to recognize the scene characteristic in other scenes of that video, the processor 102 may be further configured to associate the lighting control instruction of the scene with one or more intermediary scenes in between the scene and the further scene. This is illustrated in FIG. 3, which illustrates three images of three scenes 302, 304, 306 of a movie wherein two cars approach a railway crossing. The first scene 302 has a first scene characteristic, namely a red flashing railway crossing light 310. A user may, for example, select a lighting control instruction for the first scene 302 (e.g. a lighting control instruction comprising a control command for controlling a light source such that it emits red flashing light). Upon identifying this first scene characteristic, the processor 102 may look for a similar/identical characteristic in other scenes of the video. The processor 102 may identify the same red flashing railway crossing light 310 in the third scene 306, and associate the same lighting control instruction (i.e. the lighting control instruction comprising the control command for controlling the light source such that it emits red flashing light) with the third scene 306. In the example of FIG. 3, the processor 102 may associate the same lighting control instruction (i.e. the lighting control instruction comprising the control command for controlling the light source such that it emits red flashing light) with the second scene 304. As a result, when a user is watching this movie wherein the two cars approach the railway crossing, a light source will be flashing red light during the first, second and third scene, even though the first scene characteristic is not present during the second scene 304. This enhances the user experience of watching the movie.

Figure 4A:
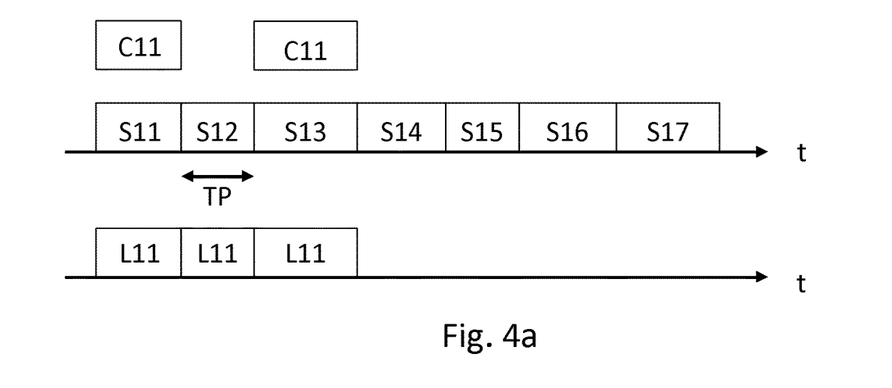
FIGS. 4a and 4b schematically show examples of a timeline a plurality of scenes of a video, wherein a lighting control instruction is associated with intermediate scenes which lack the scene characteristic.

The processor 102 may be configured to associate the lighting control instruction of the scene with the one or more intermediary scenes (only) if the time period between a scene having a certain characteristic and a further scene having the same characteristic is shorter than a predefined time period. This is illustrated in FIG. 4a, wherein the processor 102 may identify a first characteristic C11 in a scene S11 and recognize the same characteristic C11 in another scene S13. If the time period TP between scenes S11 and S13 is below a threshold period, the processor 102 may associate the lighting control instruction L11 to scenes S11, to S13 and to intermediary scene S12.

Figure 4B:
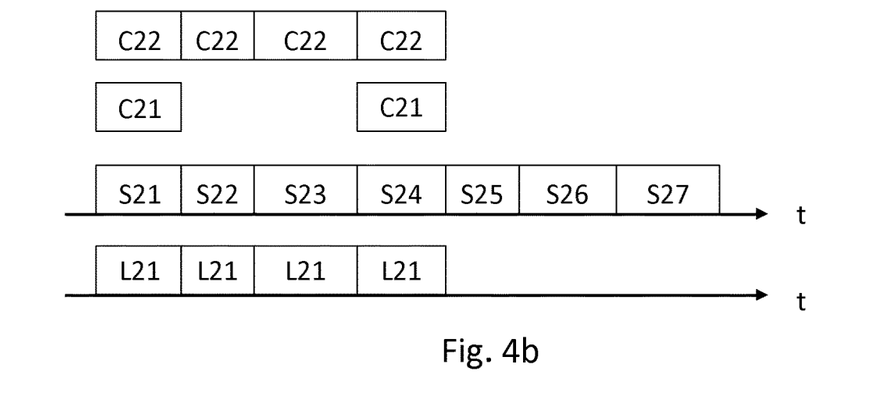

The processor 102 may be configured to analyze the scene, the further scene and the one or more intermediary scenes, and to identify a secondary scene characteristic, different from the (initial) scene characteristic, in each of the scene, the further scene and the one or more intermediary scenes. The processor 102 may be further configured to associate the lighting control instruction of the scene with the one or more intermediary scenes (only) if the secondary scene characteristic has been identified in the scene, the further scene and the one or more intermediary scenes. This is illustrated in FIG. 4b, wherein the processor 102 may identify a first characteristic C21 in a scene S21 and recognize the same characteristic C21 in another scene S24. The processor 102 may further analyze the scene S21, the other scene S24 and the intermediary scenes S22-S23 and identify a secondary scene characteristic C22 in these scenes S21-S24. The first characteristic C21 may, for example, relate to a visual characteristic (e.g. a specific object or person), and the second characteristic may, for example, relate to an auditory characteristic (e.g. background music). Based thereon, the processor 102 may associate the lighting control instruction L21 with scenes S21, S24 and intermediary scenes S22-S23.

The processor 102 may be further configured to prompt a user to accept or reject the association between the lighting control instruction and the one or more intermediary scenes in between the scene and the further scene. The processor 102 may receive this acceptance/rejection via a user interface connected to the processor 102.

The processor 102 may be configured to identify at least one object, shape, character and/or person in the scene as the scene characteristic. The processor 102 may recognize the object, shape, character and/or person by analyzing one or more images of the scene with known image analysis techniques. Similarly, the processor 102 may be configured to analyze the other scenes of the video (or of another video) to identify the at least one recognized one object, shape, character and/or person in one of those scenes. In a first example, wherein a certain actor has been recognized in a scene, and a certain (user-defined) lighting control instruction has been associated with that scene, that lighting control instruction may be applied to all scenes wherein the actor has been recognized. In a second example, wherein a certain object has been recognized in a scene, and a certain (user-defined) lighting control instruction has been associated with that scene, that lighting control instruction may be applied to all scenes wherein the object has been recognized.

Additionally or alternatively, the processor 102 may be configured to identify at least one audio fragment in the scene as the scene characteristic. The processor 102 may recognize at least one audio fragment by analyzing the audio track of the scene. Similarly, the processor 102 may be configured to analyze the other scenes of the video (or of another video) to identify the at least one recognized at least one audio fragment in one of those scenes. In a first example, wherein a certain sound effect has been recognized in a scene, and a certain (user-defined) lighting control instruction has been associated with that scene, that lighting control instruction may be applied to all scenes where the sound effect has been recognized. In a second example, wherein a certain song has been recognized in a scene, and a certain (user-defined) lighting control instruction has been associated with that scene, that lighting control instruction may be applied to all scenes wherein the song has been recognized.

The processor 102 may be configured to identify a plurality of scene characteristics in the scene. The processor 102 may be further configured to control a user interface to communicate the plurality of scene characteristics to a user via the user interface. The user interface may be configured to receive one or more user inputs (for example touch inputs via a touch screen) representative of a selection of one or more of the plurality of scene characteristics. A user may select one or more characteristics in the (initial) scene of the video which may subsequently be used for analysis of other scenes of the video (or the other video).

Figure 4C:
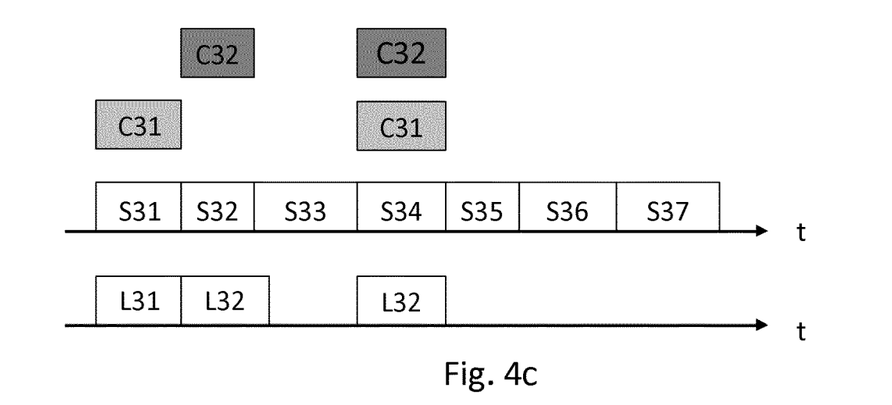
FIG. 4c schematically shows an example of a timeline a plurality of scenes of a video, wherein different scene characteristics have different weight values.

Additionally, a weight value may be provided for each scene characteristic. The weight value may be a priority value indicative of which scene characteristic has the highest/lowest priority. The weight value may be based on a user input received via a user interface, based on a number of occurrences of the scene characteristic in the video, based on the dominance of the scene characteristic in the scene (e.g. based on the size of an object/person), based on the presence of other (more/less prominent) scene characteristics in a scene, etc. FIG. 4c illustrates an example wherein the processor 102 may identify a first characteristic C31 with a first weight value (for example a value of 6) in a first scene S31 and identify a second scene characteristic C32 with a second weight value (for example a value of 8) in a second scene S32. The processor 102 may further recognize both scene characteristics C31 and C32 in a further scene S34. The processor 102 may determine, based on the first and second weight values, to associate the lighting control instruction associated with the second scene C32 because the second scene characteristic C32 has a higher weight value than the first scene characteristic C31.

Figure 5:
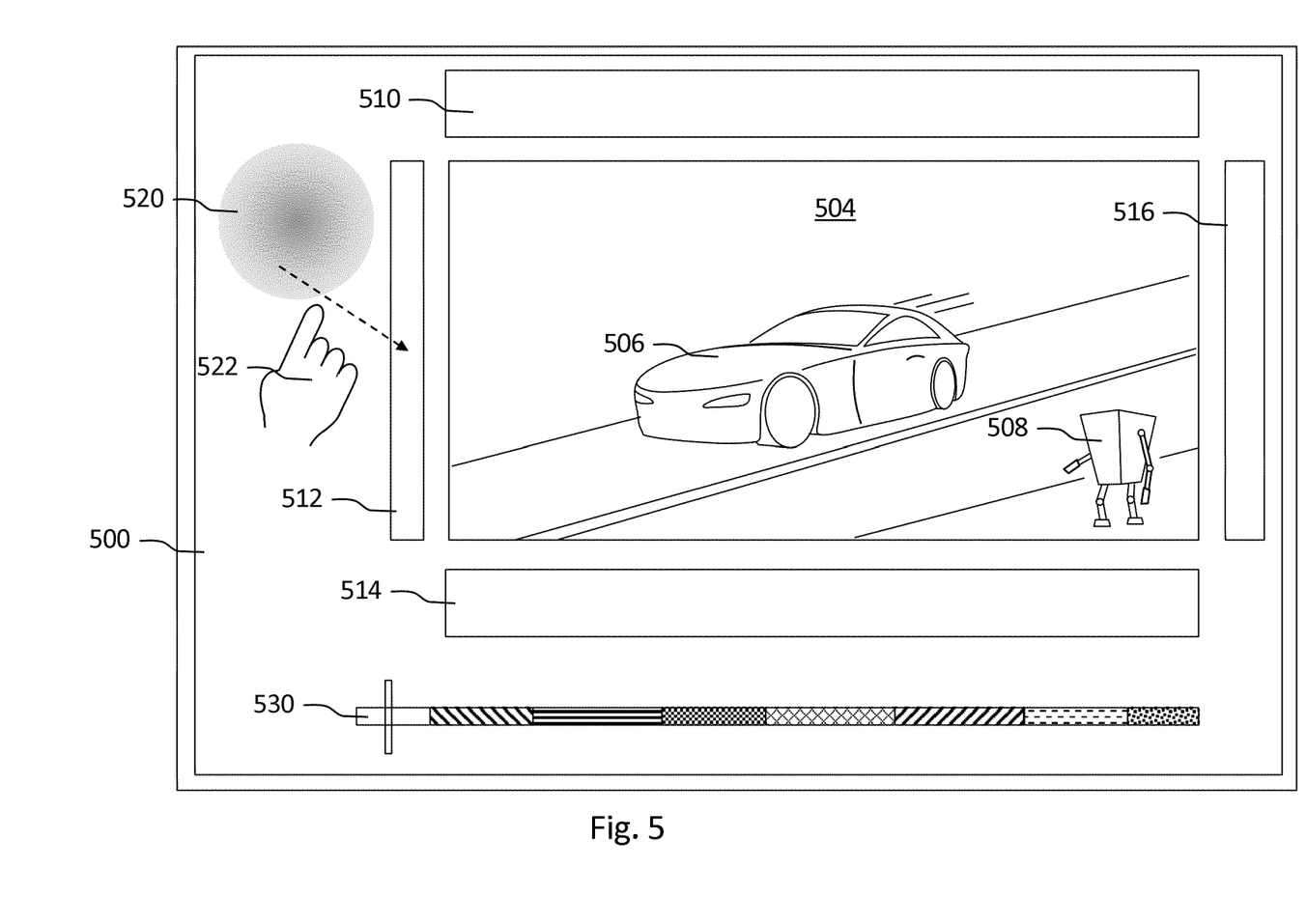
FIG. 5 shows schematically an embodiment of a user interface for creating a light script for a video.

FIG. 5 shows schematically an embodiment of a user interface of a software application for creating a light script for a video. In FIG. 5, the user interface may be displayed on a display 500. The user interface may comprise a video area 504 for displaying the video. The user interface may further comprise a scene selector 530, for example a slider, which enables a user to select a scene of the video. Upon selecting the scene, the processor 102 may automatically determine a lighting control instruction for that scene, or the user may select a lighting control construction, for example by selecting 522 a color from a color picker 520. Alternatively, the user may select/pick a color on the display area 504 (for example the color of the vehicle 506). The color may be applied to one of the areas 510, 512, 514, 516 surrounding the display area 504. The areas 510, 512, 514, 516 may be indicative of positions where the colors are to be created by light sources when video is being displayed. A user may, for example, select a first color for a top area 510, a second color for a left area 512, a third color for a bottom area 514 and a fourth color for a right area 516. These colors may be saved in the light script for the selected scene, such that when the video is being displayed on a display, light sources positioned above the display are controlled according to the first color, light sources positioned right to the display are controlled according to the second color, light sources positioned below the display are controlled according to the third color and light sources positioned left to the display are controlled according to the fourth color. After the lighting control instruction has been defined by the user via the user interface, the processor 102 may analyze other scenes of the video to recognize, in a further scene, a scene characteristic (e.g. the vehicle 506 and/or the character 508) of the initial scene.

Figure 6:
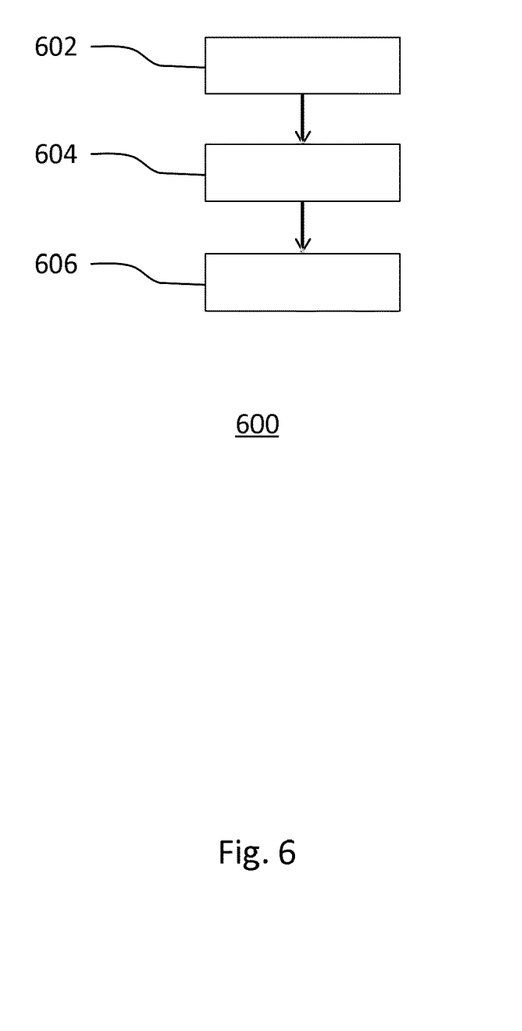
FIG. 6 shows schematically a method of creating a light script for a video.

FIG. 6 shows schematically a method 600 of creating a light script for a video, the light script comprising lighting control instructions for controlling one or more light sources when the video is being displayed. The method 600 comprises:

analyzing 602 a scene of the video to identify a scene characteristic in the scene, analyzing 604 the video or another video to recognize, in a further scene, the scene characteristic, and associating 606 a lighting control instruction with the scene and the further scene, such that when the scene and the further scenes are being displayed the one or more light sources are controlled according to the lighting control instruction.

The method 600 may be executed by computer program code of a computer program product when the computer program product is run on a processing unit of a computing device, such as the processor 102 of the system 100.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, SSD, removable disks and CD-ROM disks. The computer program product may be distributed on such a storage medium, or may be offered for download through HTTP, FTP, email or through a server connected to a network such as the Internet.

The invention claimed is:

1. A method of creating a light script for a video, the light script comprising lighting control instructions for controlling one or more light sources when the video is being displayed, the method comprising:

receiving a user input indicative of a selection of a lighting control instruction for a scene, associating the lighting control instruction with the scene, analyzing the scene of the video to identify a scene characteristic in the scene, analyzing the video or another video to recognize, in a further scene, a similar or identical scene characteristic, and associating, based on the recognition of the similar or identical scene characteristic, the lighting control instruction with the further scene, such that when the scene and the further scene are being displayed the one or more light sources are controlled according to the lighting control instruction.

2. The method of claim 1, further comprising:

extracting one or more colors from one or more images of the scene, and generating the lighting control instruction based on the one or more colors.

3. The method of claim 1, wherein the lighting control instruction comprises color information, position information and/or timing information for controlling the one or more light sources.

4. The method of claim 1, wherein the method further comprises associating the lighting control instruction with one or more intermediary scenes of the video in between the scene and the further scene.

5. The method of claim 4, wherein the step of associating the lighting control instruction with the one or more intermediary scenes is executed if a time period between the scene and the further scene is below a threshold time period.

6. The method of claim 4, further comprising the steps of:

analyzing the scene, the further scene and the one or more intermediary scenes, identifying a secondary scene characteristic, different from the scene characteristic, in each of the scene, the further scene and the one or more intermediary scenes, wherein the step of associating the lighting control instruction with the one or more intermediary scenes is executed if the secondary scene characteristic has been identified in the scene, the further scene and the one or more intermediary scenes.

7. The method of claim 1, wherein the step of analyzing the scene to identify the scene characteristic comprises identifying at least one object, shape, character and/or person in the scene, and wherein the step of analyzing the video or another video to recognize, in the further scene, the scene characteristic comprises recognizing the at least one recognized one object, shape, character and/or person in the further scene.

8. The method of claim 1, wherein the step of analyzing the scene to identify the scene characteristic comprises identifying at least one audio fragment in the scene, and wherein the step of analyzing the video or another video to recognize, in the further scene, the scene characteristic comprises recognizing the at least one recognized audio fragment in the further scene.

9. The method of claim 1, wherein the step of analyzing the scene to identify the scene characteristic in the scene comprises identifying a plurality of scene characteristics in the scene, and wherein the method further comprises:
 communicating the plurality of scene characteristics to a user via a user interface,
 receiving one or more user inputs representative of a selection of one or more of the plurality of scene characteristics,
 and wherein the analysis of the video or another video comprises recognizing, in the further scene, the one or more selected scene characteristics.

10. The method of claim 1, wherein the method further comprises:
 obtaining a first weight value for a first scene characteristic in a first scene associated with a first lighting control instruction,
 obtaining a second weight value for a second scene characteristic in a second scene associated with a second lighting control instruction, and
 associating, if the first and second scene characteristics are recognized in the further scene, the first or the second lighting control instruction with the further scene based on the first and second weight values.

11. The method of claim 1, further comprising, before associating the lighting control instruction with the further scene, receiving a user input indicative of an acceptance of the association between the lighting control instruction and the further scene.

12. The method of claim 1, further comprising storing the light script as a computer readable file, or embedding the light script in a video file of the video.

13. A computer program product for a computing device, the computer program product comprising computer program code to perform the method of claim 1 when the computer program product is run on a processing unit of the computing device.

14. A system for creating a light script for a video, the light script comprising lighting control instructions for controlling one or more light sources when the video is being displayed, the system comprising:
 a user interface configured to receive a user input indicative of a selection of a lighting control instruction for a scene, and
 a processor configured to associate the lighting control instruction with the scene, analyze the scene, to identify a scene characteristic in the scene, analyze the video or another video to identify, in a further scene, a similar or identical scene characteristic, and to associate, based on the recognition of the similar or identical scene characteristic, the lighting control instruction with the further scene, such that when the scene and the further scene are being displayed the one or more light sources are controlled according to the lighting control instruction.

\* \* \* \* \*